June 23, 1931.  L. RISK  1,811,647

TIRE CHARGING AIR PUMP

Filed Jan. 20, 1930   2 Sheets-Sheet 1

INVENTOR
LOREN RISK
BY
ATTORNEY

June 23, 1931. L. RISK 1,811,647
TIRE CHARGING AIR PUMP
Filed Jan. 20, 1930 2 Sheets-Sheet 2
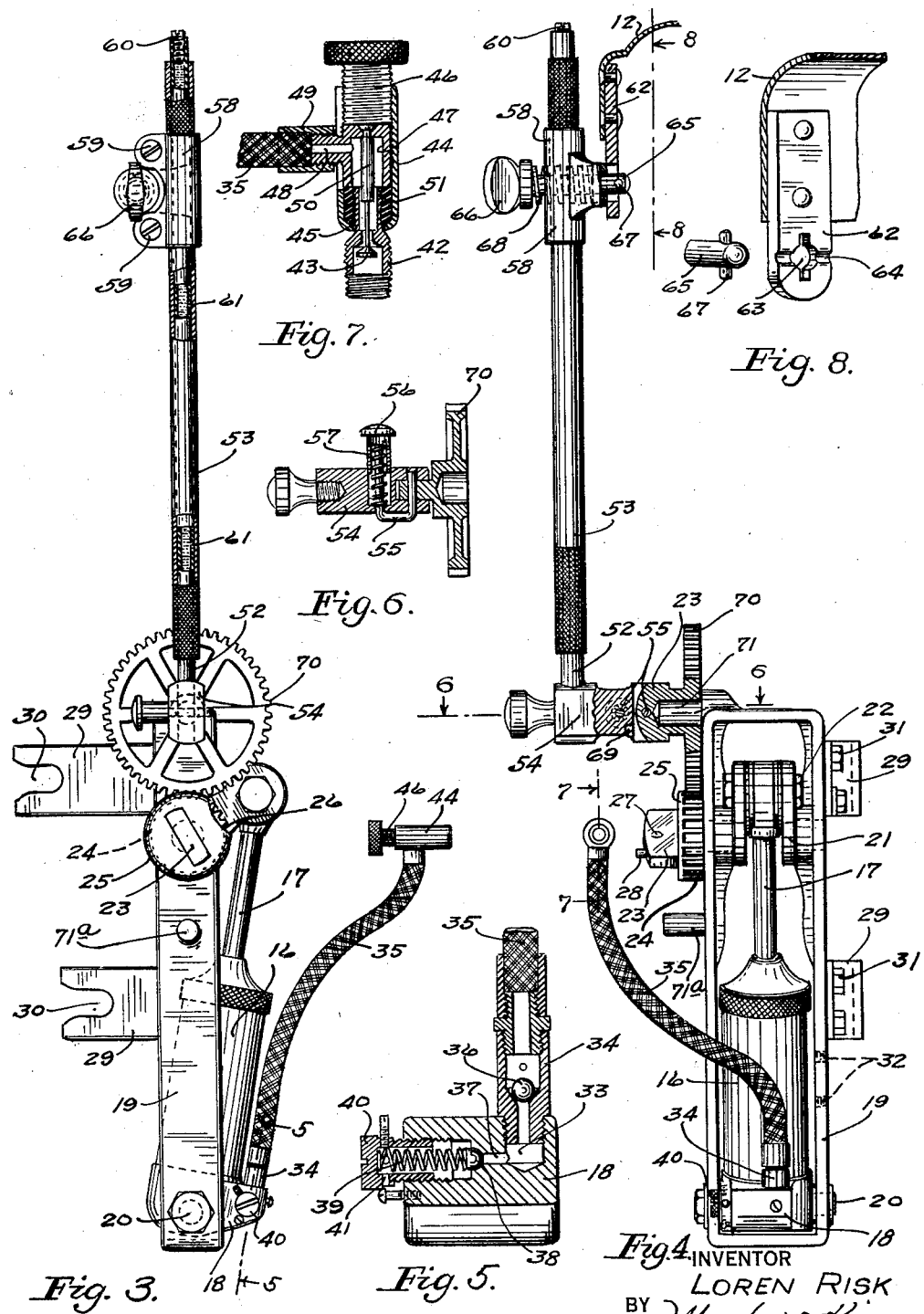
INVENTOR
LOREN RISK
BY
ATTORNEY Patented June 23, 1931

1,811,647

UNITED STATES PATENT OFFICE

LOREN RISK, OF MINNEAPOLIS, MINNESOTA

TIRE CHARGING AIR PUMP

Application filed January 20, 1930. Serial No. 422,044.

My present invention relates to tire charging air pumps of the type disclosed and broadly claimed in my prior Patent No. 1,378,387, of date September 10, 1918, and the present invention is in the nature of a modification of or improvement on said earlier pump. These pumps are of the type adapted for application to an automobile wheel and to be operated by rotation of the wheel so that the tire may, even in case of bad puncture, be charged while the vehicle is in motion and maintained in charged condition within safe pressure limits at least until some place may be reached for proper tire repair.

The invention improves generally the features of the earlier pump and as a further important feature provides means whereby, under hand operation or by giving a wheel a few rotations while the vehicle is standing still with the wheel jacked up from the ground, enough pressure may be quickly pumped into the tire to permit such initial charging as will make it feasible to complete and maintain the charge in the tire under rotation of the wheel produced by travel of the automobile or motor-propelled vehicle. The device also includes a speed-multiplying device for speeding up the movement of the pump for rotation of the wheel and which will be found serviceable especially for slow-moving vehicles having very large pneumatic tires.

In the accompanying drawings, which illustrate the invention, like characters indicate like parts throughout the several views.

Referring to the drawings:

Fig. 3 shows the pump in side elevation with some parts broken away and some parts sectioned;

Fig. 4 is a front elevation of the pump shown in Fig. 3 and also in Figs. 1 and 2;

Fig. 5 is a section taken on the line 5—5 of Fig. 3;

Fig. 6 is a section taken on the line 6—6 of Fig. 4;

Fig. 7 is a section taken on the line 7—7 of Fig. 4; and

Fig. 8 is a perspective with some parts sectioned and with some of the parts separated showing the parts found in the vicinity of the line marked 8—8 on Fig. 4.

Figure 2:
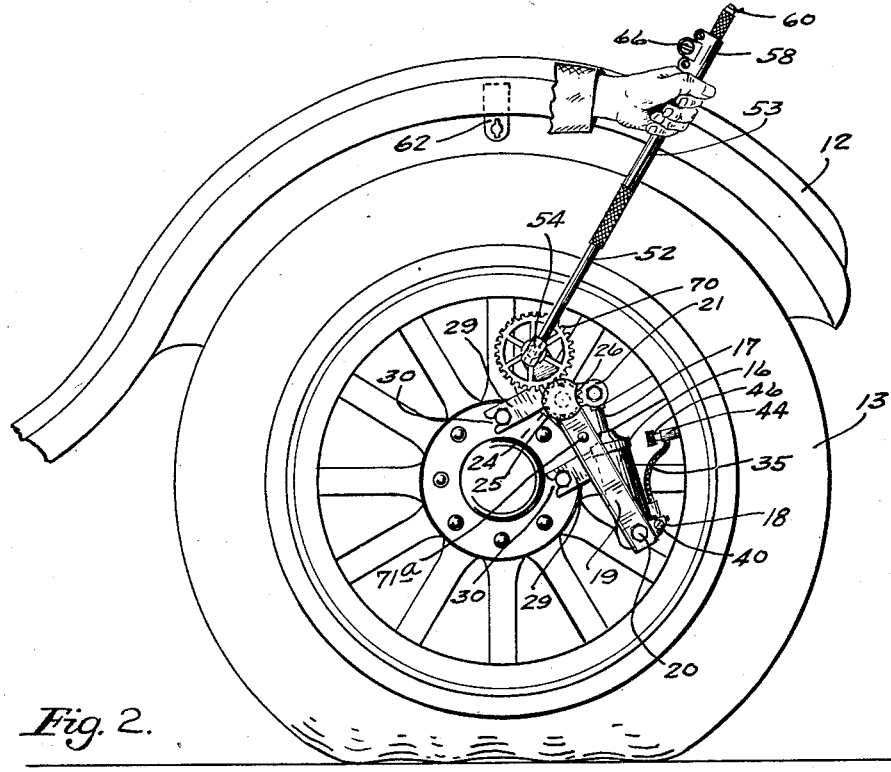
Fig. 2 is a fragmentary view showing the pump applied to the front wheel of the vehicle and illustrating the manner in which the pump may be hand-operated to initially charge a badly deflated tire.

Of the parts of the automobile or motor-propelled vehicle, the numeral 9 indicates the body, the numeral 10 the rear fender, the numeral 11 a rear wheel, the numeral 12 the front fender, the numeral 13 the front wheel, and the numeral 14 one of the running boards. The pump is adapted for application to wheels of various different kinds, but as shown, it is applied to wheels of the artillery type. The hub plates or flanges of such wheels are customarily clamped onto the spokes by nut-equipped bolts 15. In most instances the nuts of such bolts are on the outer sides of the wheels but where they are not, two of such bolts can readily be reversed so that their nuts will be on the outer sides of the wheels and this, as will presently appear, is for the purpose of anchoring the pump mechanism to the wheel for rotation therewith.

Figure 1:
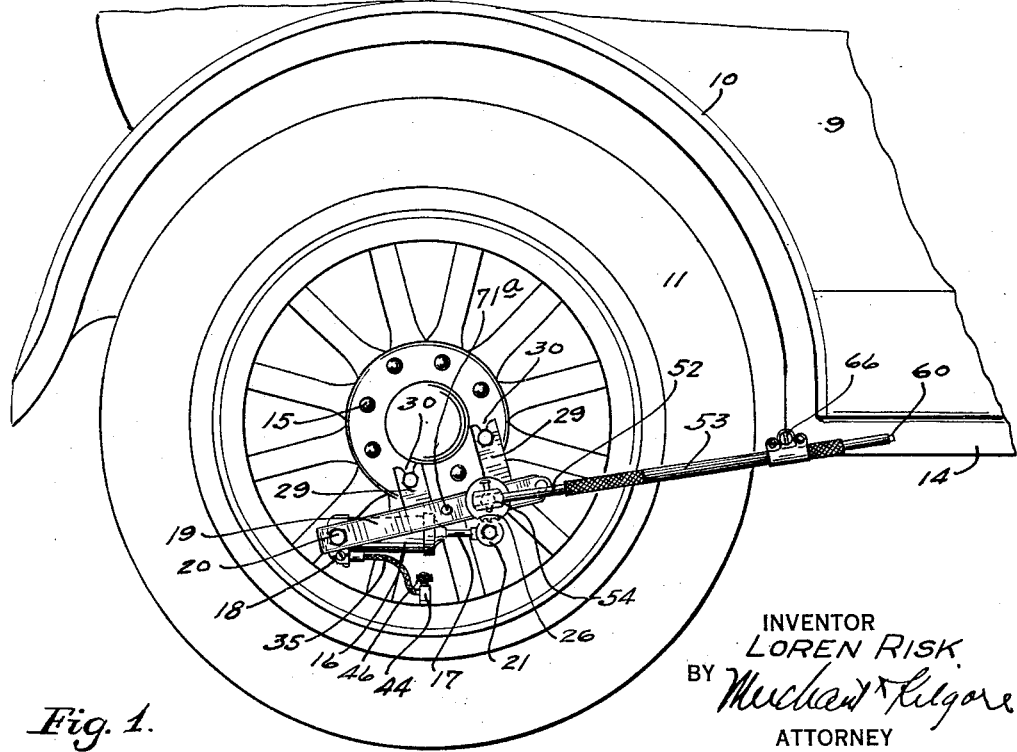
Fig. 1 is a fragmentary side elevation showing the pump applied to the rear wheel of an automobile or motor-propelled vehicle.

The pump comprising a cylinder 16, and a co-operating piston 17, the stem of which works through one head of the said cylinder. Cylinder 16, at its base end, is secured to a block-like cylinder head 18 that works between the sides of a rectangular frame 19 and by a bolt or pintle 20 is pivoted to one end portion of said frame. A short crank shaft 21 works within the frame 19 and is journaled to that end thereof that is opposite to the pintle 20; and the stem of piston 17 is pivoted on the wrist pin 22 of said crank shaft. At one outer end crank shaft 21 is provided with a flattened or angular shank 23, which, for one of the purposes above noted and hereinafter more fully described, is provided with a spur pinion 24 formed on its outer face with a projecting retaining flange 25 that has a segmental notch 26. The shank 23 has a transverse perforation 27 and an eccentrically located longitudinally projected dowel pin 28. For anchoring the frame 19 to a wheel of the vehicle, it is shown as provided with anchoring lugs 29 formed with open bolt seats or notches 30, at their outer ends. Lugs 29 are secured to the inner side of the frame 19 by bolts or screws 31 that may be engaged with different threaded holes 32 formed in said frame so that said lugs may be variably spaced for different wheels. To secure the frame 19 to the wheel for rotation therewith, two of the bolts 15 will be loosened and the notched lugs 29 are slipped straddle of the bolts under the heads or nuts thereof, and the bolts are then tightened to secure the frame to the wheel as shown in Figs. 1 and 2.

The cylinder 16 and piston 17 constitute an air pump of the reciprocating type. In its head 18, cylinder 16 has an air discharge port 33 that leads to a discharge nipple 34, to which a flexible air hose or pipe 35 is attached. The nipple 34 is provided with an outwardly-opening check valve 36 and head 18 is provided with a safety air discharge port 37 that is normally kept closed by an outwardly-opening relief valve 38, see particularly Fig. 5. Relief valve 38 is arranged to be set under a desired high pressure by a coiled spring 39 that is made adjustable by a cap nut 40 that is screwed into the head 18 and has an outwardly-opening air escape passage 41. Relief valve 38 will be set under such pressure that it will remain closed until the air pumped into a tire exceeds a predetermined maximum desired pressure or approaches a pressure that might blow up a tire. At its free end the flexible air pipe 35 is provided with a coupling head that is adapted for application to the air-receiving nipple of a pneumatic tire to be charged. This air-receiving nipple removed from the tire is shown in Fig. 7 and is there indicated by the numeral 42 and is equipped with the customary check valve 43. The coupling head above noted as preferably constructed and as best shown in Fig. 7, comprises a tubular casing 44 contracted at one end at 45 and internally threaded at its other end to receive a clamping screw 46. Within the casing 44 is a cup-shaped inner head 47 that is provided with a laterally projecting air-receiving nipple 48 that is screwed into a sleeve 49 on the free end of the air hose 35. The casing 44 has a longitudinal slot through which the nipple 48 is projected. The inner head 47 is shown as provided with an axially secured stem 50 which, when the coupling head is applied to the air-receiving nipple, engages and unseats the check valve 43 of the latter. The numeral 51 indicates a pliable gasket preferably of rubber that is placed in the casing 44 between the contracted end 45 thereof and the open end of the cup-shaped head 47. This gasket 51 will slip freely over the reduced end of the nipple 42 when not compressed but when compressed by turning the screw 46 against head 47, said gasket will be laterally expanded against the nipple and secure the coupling head to the nipple.

For reciprocating the pump under rotation of the wheel to which it is applied, there is provided an anchoring rod preferably made up of telescopic sections 52 and 53, the former of which is provided with a laterally projecting head 54 that is notched or bifurcated to receive and closely fit the flattened or angular shank 23 of crank shaft 21. This head 54 has a lock pin 55 which, as shown, is U-shaped with one prong working through its bifurcated portion and arranged to pass through the perforation 27 of the shank 23. The other and longer prong of said lock pin 55 is provided with a cap-like head 56 and is subject to a coiled spring 57 that tends to hold said lock pin, as best shown in Fig. 7. By pressing on head 57, the lock pin may be released from the co-operating lug 23. Secured on the free end of the outer rod section 53 is a split sleeve 58 that is clamped to said rod section by screws 59. Outer rod section 53, of course, is tubular and preferably the inner rod section 52 is also made tubular so that it will contain lubricating grease. The outer end of rod 52 is closed by a threaded plug 60 which, when screwed inward, will force grease outward through one or more small grease-delivery passages 61, shown in Fig. 3, so as to keep the contacting surfaces of the two rod sections well lubricated.

For pivotally anchoring the outer rod section 53 when the pump is applied to the front wheel of an automobile, the front fenders 12 are provided with anchor lugs 62 formed with key hole slots 63 and with transverse depressed pin seats 64. A coupling pin 65 is quite loosely passed through an offset lug or portion of the sleeve 58 and at one end is provided with a flattened head 66 and at its other end with laterally projecting pins 67. A quite heavy coiled spring 68 placed around pin 65 is compressed between the offset portion of sleeve 58 and head 66 of said pin. When lugs 67 are aligned with the diametrically extended portions of key slot 63, they may be passed through said key hole and turned into engagement with the seats 64 and there held under the tension of spring 68.

As shown in Fig. 2, anchoring lugs 62 are applied in a direct line vertically over the axes of the front wheels so that the pump-operating connections will be but slightly moved by the steering movements of the front wheels and all such movements will be permitted by flexibility in the joints and by the yielding action of the spring 68.

When the pump is applied to a rear wheel of an automobile the rear fenders 10 preferably close to the running boards 14 will be provided with the same key hole slot and anchoring lug such as best shown in Fig. 8 and above described. To cause the telescopic rod to be connected to the shank 23 of the crank shaft 21 in such way that the last half of the compression stroke will come when the said rod is shortest, head 54 is provided with a dowel pin seat 69, see Fig. 4, that will receive the dowel pin 58 and permit application of head 54 to said shank 23 only when in the relative adjustment just stated.

As a speed multiplying device, there is provided a gear 70 that is of much larger diameter than pinion 24. This gear 70 is journaled on a stud 71 projected from one side of frame 19 and this gear is provided with a flattened shank 23ª that corresponds to the shank 23 of pinion 24 and with which head 54 is engageable in the same manner as with said head 23. To permit gear 70 to be slid into mesh with pinion 24, flange 25 of pinion 24 is provided with the segmental notch 26 already noted.

When the pump is applied to the rear wheel of an automobile, as shown in Fig. 1, or as applied to the front wheel of the vehicle as shown in Fig. 2, but with the extensible anchoring rod anchored to the lug 62 of the front fender, as shown in Fig. 4, and when the wheel in either instance is rotated, the pump 16-17 will be reciprocated and air will be pumped into the tire. If the tire is flat or badly deflated so that it will be damaged by running the wheel on the ground, then an initial charge of air should be pumped into the tire by a hand reciprocation of the anchoring rod as illustrated in Fig. 2 with the speed or stroke multiplying gear 70 applied. With this gear 70 applied, approximately a ninety degree oscillation of the anchoring rod will suffice to produce complete reciprocating movements of the pump, whereas if the rod were applied directly to the shank 23 of smaller gear 24, an eighty degree movement would be required to impart a complete reciprocating movement to the pump. After a tire is given sufficient charge of air to permit it to run a short distance without damage, then the gear 70 should, in most cases, be removed and the anchoring rod applied to the shank 23 of the smaller gear and anchored to the adjacent fender. Sufficient rapid movement of the pump will be imparted with the anchoring rod applied to the shank of the smaller gear for charging of tires under all ordinary conditions and for maintaining the proper pressure in the tire even though it does leak, while the car is being run to a suitable place for tire repair. The safety valve 38 will, of course, prevent overcharging of the tire while running. In some instances, such as with slow-moving trucks having very large tires, it may be found desirable to apply the multiplying gear 70 and to connect the anchoring rod to the shank thereof so as to multiply the reciprocating movements of the pump as may then be required to pump up and maintain the pressure in the punctured tire.

In actual practice, this pump has been found highly efficient for the purposes in view and to be strong and durable. It avoids the use of a jack to jack up the wheel having a punctured tire and may be easily applied to a wheel and easily removed therefrom. Obviously, the use of this pump makes it unnecessary to remove a punctured tire until the car has been driven to a place for proper repair of the tire.

What I claim is:

An air charging device for wheels having pneumatic tires comprising a pump frame having means for attachment to the wheel, a crank journaled to said pump frame, a cylinder and piston pump with its cylinder pivoted to said pump frame and with its piston connected to said crank, said cylinder having an air discharge pipe equipped with means for attachment to a pneumatic tire, a relatively small spur gear connected to one side of said crank, a relatively large gear detachably journaled to said pump frame and removably meshed with said smaller gear on said crank, and an operating rod connected to said larger gear to reciprocate the same and oscillate said crank with a multipled stroke, said operating rod having means whereby it may be applied at will to either of said two gears and also having means whereby it may be anchored at its extended end to a relatively fixed part of a vehicle.

In testimony whereof I affix my signature.

LOREN RISK.